(12) United States Patent
Hwang

(10) Patent No.: US 9,332,695 B2
(45) Date of Patent: May 10, 2016

(54) MODULAR PLANT CONTAINER

(71) Applicant: Kee Y. Hwang, Palo Alto, CA (US)

(72) Inventor: Kee Y. Hwang, Palo Alto, CA (US)

(*) Notice: Subject to any disclaimer, the term of this patent is extended or adjusted under 35 U.S.C. 154(b) by 34 days.

(21) Appl. No.: 14/510,646

(22) Filed: Oct. 9, 2014

(65) Prior Publication Data

US 2016/0100530 A1 Apr. 14, 2016

(51) Int. Cl.
*A01G 25/00* (2006.01)
*A01G 9/02* (2006.01)
*A01G 27/00* (2006.01)

(52) U.S. Cl.
CPC .............. *A01G 9/02* (2013.01); *A01G 27/008* (2013.01)

(58) Field of Classification Search
CPC ....... A01G 9/02; A01G 27/008; A01G 27/00; A01G 31/06
USPC ............................................ 47/79, 63, 62 R
See application file for complete search history.

(56) References Cited

U.S. PATENT DOCUMENTS

| | | | | |
|---|---|---|---|---|
| 289,102 A * | 11/1883 | Holden | ................. | A01G 27/02 47/65.5 |
| 1,433,043 A * | 10/1922 | Shrauger | ................ | A01G 27/00 47/79 |
| 2,336,755 A * | 12/1943 | Sejarto | ................... | A01G 27/02 47/62 R |
| 3,452,475 A | 7/1969 | Johnson, Sr. | | |
| 4,218,847 A * | 8/1980 | Leroux | ................... | A01G 31/06 47/59 R |
| D291,667 S * | 9/1987 | Wouters | ....................... | D11/164 |
| 5,274,952 A * | 1/1994 | Wood | ....................... | A01G 9/10 47/65.5 |
| 5,309,671 A | 5/1994 | Byun | | |
| 5,404,672 A * | 4/1995 | Sanderson | ............ | A01G 9/023 47/39 |
| 5,438,797 A | 8/1995 | Lendel | | |
| 5,440,836 A | 8/1995 | Lee | | |
| 6,612,073 B1 | 9/2003 | Powell et al. | | |
| 6,840,008 B1 | 1/2005 | Bullock et al. | | |
| 7,055,282 B2 * | 6/2006 | Bryan, III | ............. | A01G 31/06 47/62 R |
| 7,080,482 B1 * | 7/2006 | Bradley | ................. | A01G 31/02 47/60 |
| 7,690,151 B2 | 4/2010 | Wilkes | | |
| 7,770,323 B2 * | 8/2010 | Kim | ......................... | A01G 9/02 47/66.3 |
| 8,051,603 B1 * | 11/2011 | Jung | ...................... | A01G 9/026 47/66.1 |
| D653,156 S | 1/2012 | Phelps et al. | | |
| 8,191,310 B2 | 6/2012 | Keats | | |
| 8,234,815 B2 | 8/2012 | Felknor et al. | | |
| 8,266,840 B2 | 9/2012 | Jung | | |
| 8,950,111 B2 * | 2/2015 | Soejima | .................. | A01G 7/02 435/292.1 |
| 2001/0052199 A1 | 12/2001 | Klein et al. | | |
| 2006/0032128 A1 * | 2/2006 | Bryan | .................... | A01G 31/06 47/62 R |
| 2007/0180766 A1 | 8/2007 | Wilkes | | |
| 2008/0141585 A1 * | 6/2008 | Benfey | ..................... | A01G 7/00 47/32.7 |
| 2009/0000189 A1 | 1/2009 | Black | | |
| 2011/0148124 A1 * | 6/2011 | Soejima | .................... | A01G 7/02 290/1 R |
| 2013/0152468 A1 | 6/2013 | Huang et al. | | |

(Continued)

FOREIGN PATENT DOCUMENTS

EP 0098474 A2 6/1983

*Primary Examiner* — Kristen C Hayes
(74) *Attorney, Agent, or Firm* — Douglas L. Weller

(57) ABSTRACT

A modular plant container includes a top having a plurality of inflow openings for receiving fluid. A bottom has a plurality of outflow openings for allowing the fluid to exit. A structure between the top and the bottom includes openings that allow light to reach a plant within the modular plant container. The structure forms a plurality of fluid paths. Each fluid path extends from one of the inflow openings in the top an associated outflow opening in the bottom. Each fluid path has a gap sized to allow a diverter. The diverter when present, divert fluid to a target location within the modular plant container.

17 Claims, 11 Drawing Sheets

(56) References Cited

U.S. PATENT DOCUMENTS

2014/0279181 A1* 9/2014 Wills .................. A01G 9/02 705/26.5

2015/0027046 A1* 1/2015 Adolf .................. A01G 9/02 47/65.5

2015/0059244 A1* 3/2015 Hashimoto ............ A01G 9/025 47/79

* cited by examiner

MODULAR PLANT CONTAINER

BACKGROUND

Containers for plants can be in many shapes and can be formed of many different types of materials, such as ceramics, plastics, wood and so on. Plant containers may be stacked for various reasons such as convenience, space saving, display and so on. Stacking plant containers can raise issue as to how to conveniently provide plant essentials, such as light and water.

DESCRIPTION OF THE EMBODIMENT

A modular plant container is configured to maximize light availability and simplicity of watering. A structure of the planter is arranged so that there are open regions in the top and sides to allow light entry to a plant. Water paths are provided along each of four corners of the planter. Each modular plant container can be configured to allow water entering the modular plant container in one or more of the corners to be diverted to watering a plant contained within the modular plant container. In other corners where water is not diverted to watering a plant contained within the modular plant container, water is allowed to flow down the corner of the modular plant container to be available to another modular plant container below.

Figure 1:
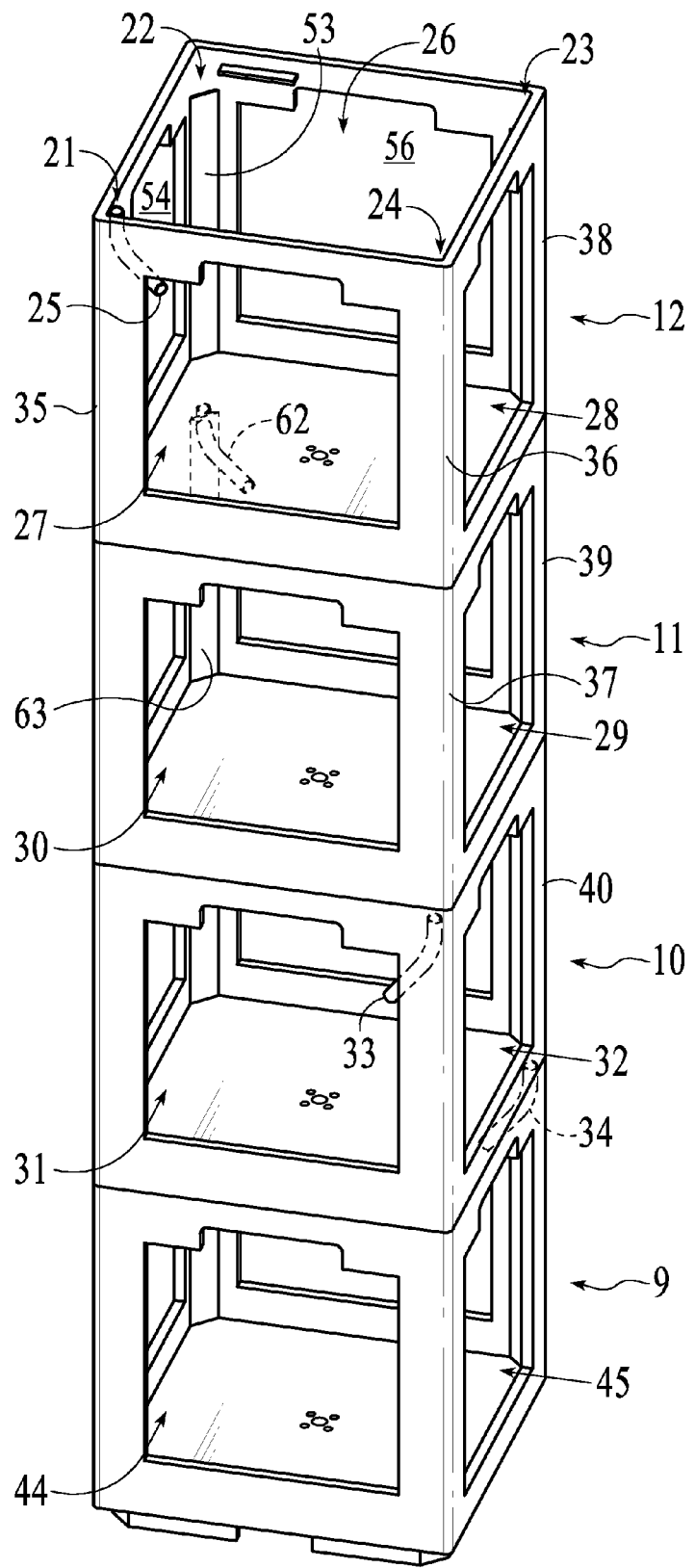
FIG. 1 shows stacked plant containers in accordance with an implementation.

FIG. 1 shows a stack of modular plant containers. A modular plant container 12 is stacked on top of a modular plant container 11, which in turn is stacked on top of a modular plant container 10. Modular plant container 10 is stacked on top of a modular plant container 9. While FIG. 1 shows a stack of four modular plant containers, less than our modular plant containers can be stacked. Also, stacks of modular plant containers can be placed side by side to create a wall of stacked modular plant containers.

An opening 26 on top of modular plant container 12, an opening 27 at a front of modular plant container 12 and an opening 28 at a side of modular plant container 12, shown in FIG. 1 allow light to reach a plant held within plant container 12. Likewise, an opening 30 at a front of modular plant container 11 and an opening 29 at a side of modular plant container 11, shown in FIG. 1 allow light to reach a plant held within plant container 11. Likewise, an opening 31 at a front of modular plant container 10 and an opening 32 at a side of modular plant container 10, shown in FIG. 1 allow light to reach a plant held within modular plant container 10. Likewise, an opening 44 at a front of modular plant container 9 and an opening 45 at a side of modular plant container 9, shown in FIG. 1 allow light to reach a plant held within modular plant container 9.

Opening 28 of modular plant container 12 is open to a bottom of modular plant container 12 in order to increase convenience of moving a plant container in and out of modular plant container 12. This is the same for opening 29 of modular plant container 11, opening 32 of modular plant container 10 and opening 45 of modular plant container 9.

In order to water a plant or plants held within modular plant container 12, water is poured into an opening 21 at a top of modular plant container 12. A diverter 25 diverts the water poured into opening 21 to the plant held within modular plant container 12. For example, diverter 25 can be a tube or some other device that catches water and directs the water to a location within modular plant container 12. Without the presence of diverter 25, water would continue down a water path 35 to modular plant container 11.

In order to water a plant or plants held within modular plant container 11, water is poured into an opening 22 at a top of modular plant container 12. The water travels down a water path 53 to modular plant container 11. A diverter 62 diverts the water poured into opening 22 to the plant held within modular plant container 11. For example, diverter 62 can be a tube or some other device that catches water and directs the water to a location within modular plant container 11. Without the presence of diverter 62, water would continue down a water path 63 to modular plant container 10.

In order to water a plant or plants held within modular plant container 10, water is poured into an opening 24 at a top of modular plant container 12. The water travels down a water path 36 and a water path 37 to modular plant container 10. A diverter 33 diverts the water to the plant held within modular plant container 10.

In order to water a plant or plants held within modular plant container 9, water is poured into an opening 23 at a top of modular plant container 12. The water travels down a water path 38, a water path 39 and a water path 40 to modular plant container 9. A diverter 34 diverts the water to the plant held within modular plant container 9.

Since there are four corners to modular plant container 12 and thus four water paths, this allows up to four modular plant containers to be stacked on top of each other while still having a separate water path for each of the four stacked modular plant containers. To stack higher, additional water paths need to be added. For example, one or more water paths can be added down a middle of one or more of the sides of modular plant container 12. Alternatively, modular plant container can be shaped differently to have more corners. For example, instead of being square, modular plant container 12 could have a pentagon shape or a hexagon shape, allowing for five or six water paths, respectively, down corners of the plant container.

Figure 2:
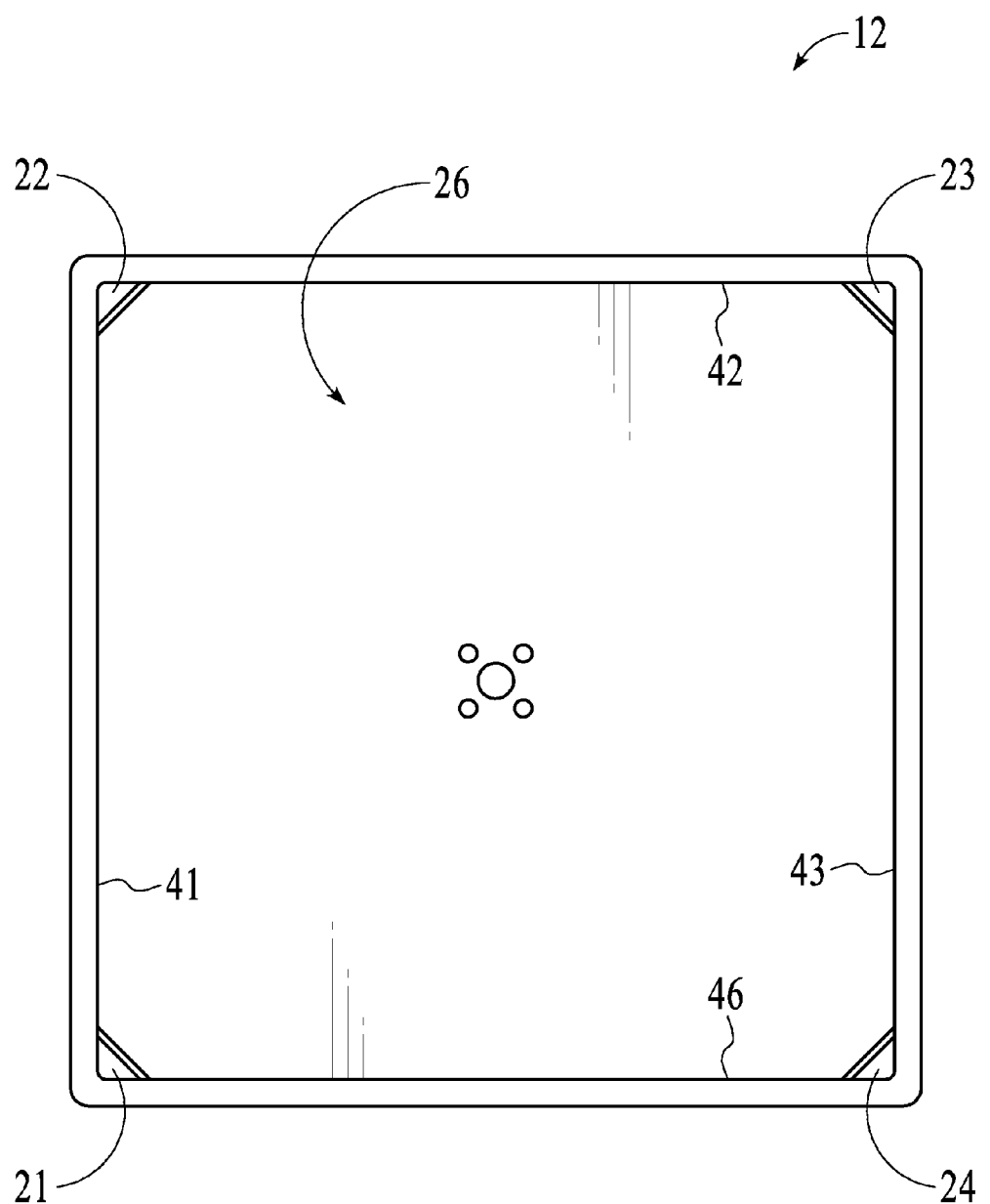
FIG. 2 shows a top view of a plant container in accordance with an implementation.

FIG. 2 shows a top view of modular plant container 12. Tracks 41, 42, 43 and 46 are shaped to allow precise fitting when stacking another modular plant container on top of modular plant container 12.

Figure 3:
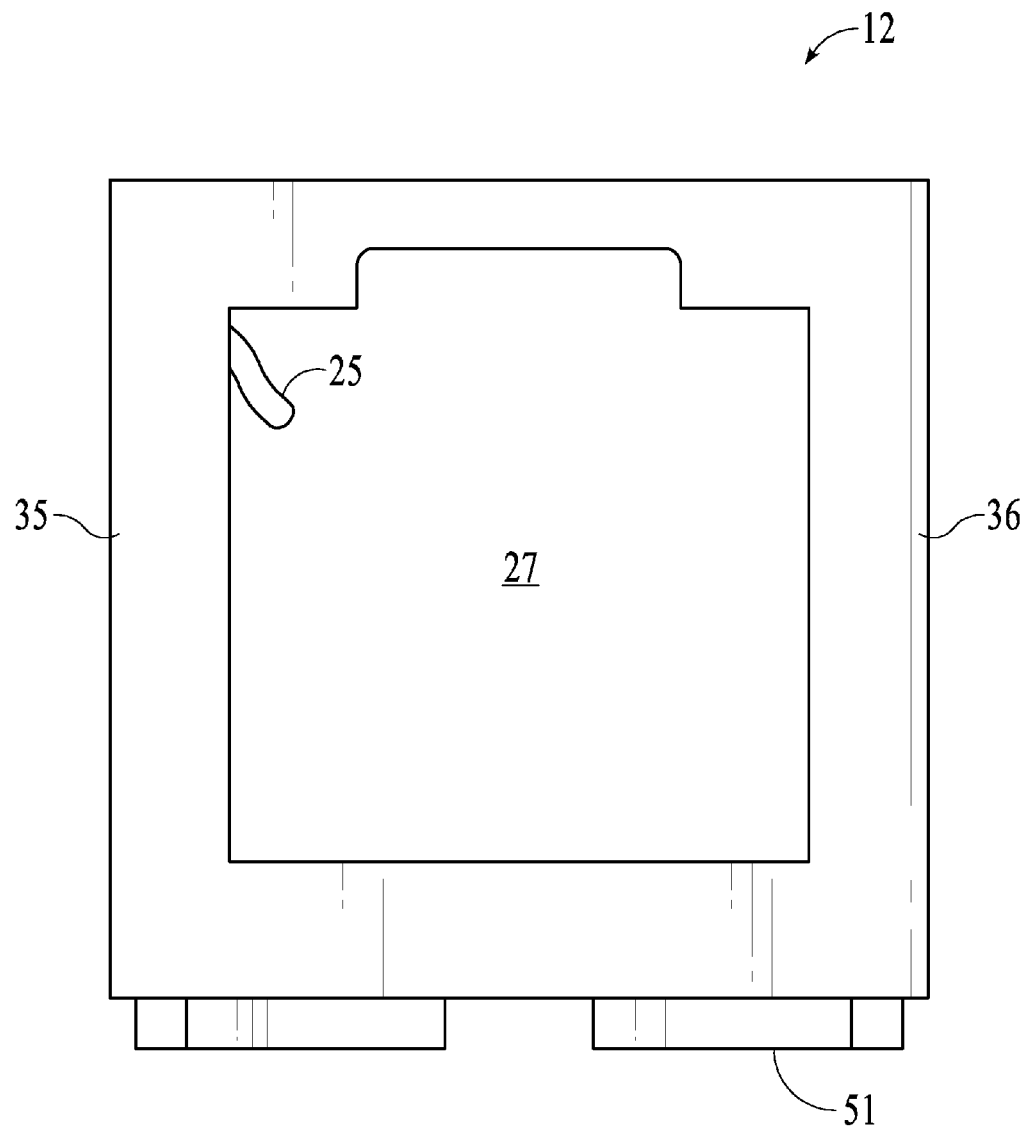
FIG. 3 shows a front side view of a plant container in accordance with an implementation.

FIG. 3 shows a front view of modular plant container 12. Tracks 51 are shaped to allow precise fitting when stacking another modular plant container below modular plant container 12.

Figure 4:
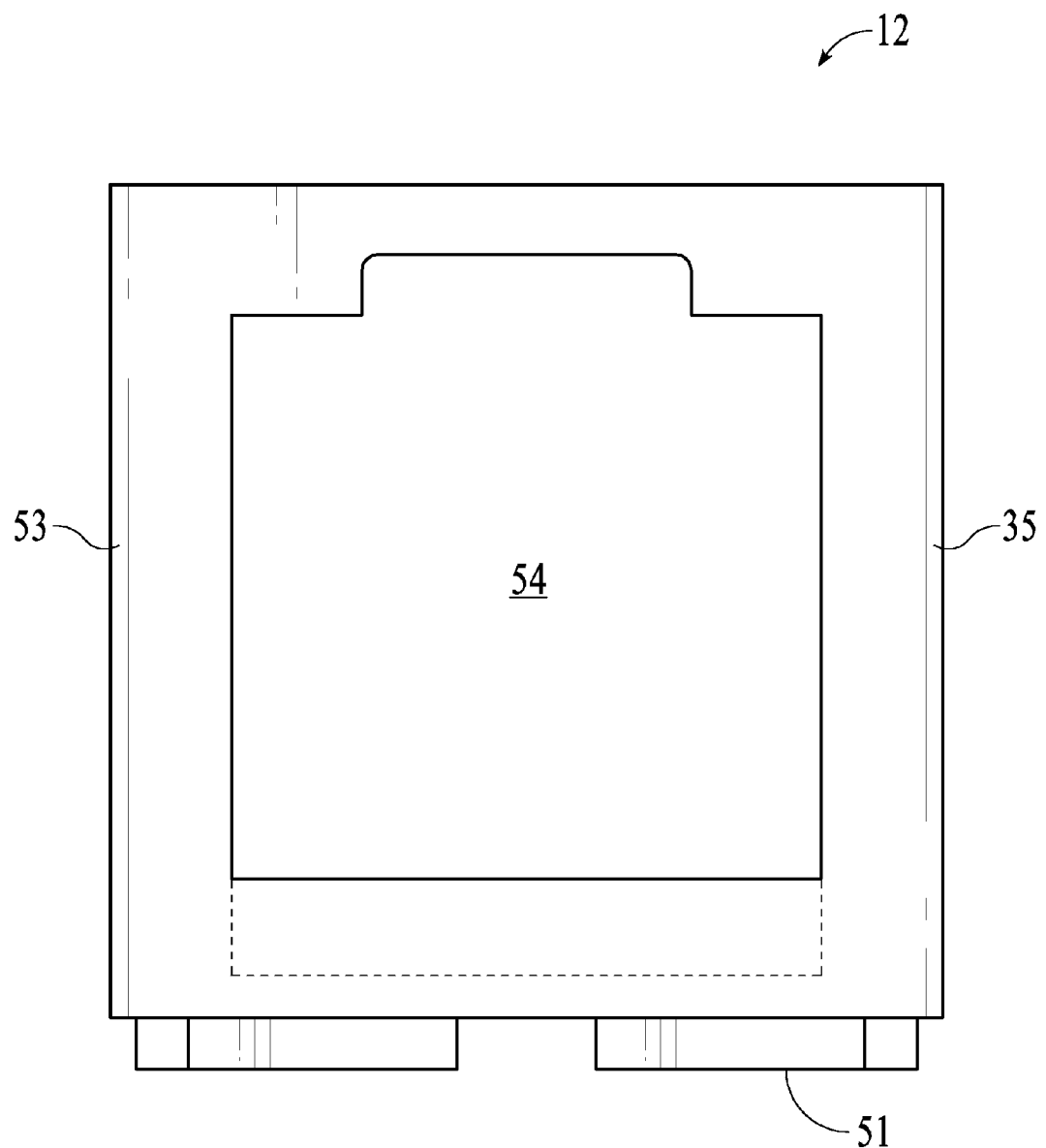
FIG. 4 shows a left side view of a plant container in accordance with an implementation.

FIG. 4 shows a left side view of modular plant container 12. Tracks 51 are shaped to allow precise fitting when stacking another modular plant container below modular plant container 12. Water poured into opening 22 (shown in FIG. 2) at the top of modular plant container 12 travels down a water path 53 to modular plant container below modular plant container 12, unless diverted to water a plant within modular plant container 12.

Figure 5:
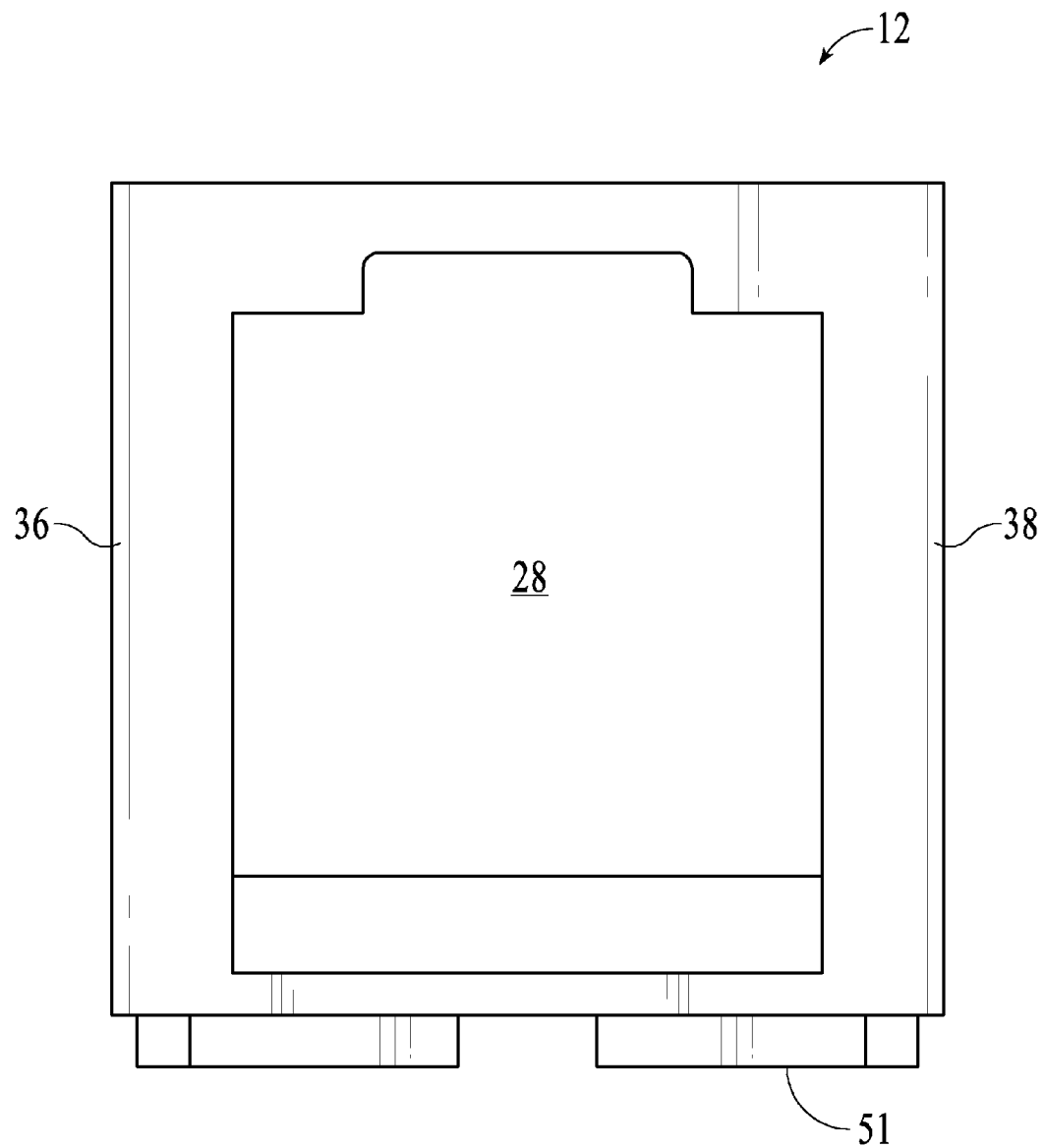
FIG. 5 shows a right side view of a plant container in accordance with an implementation.

FIG. 5 shows a right side view of modular plant container 12.

Figure 6:
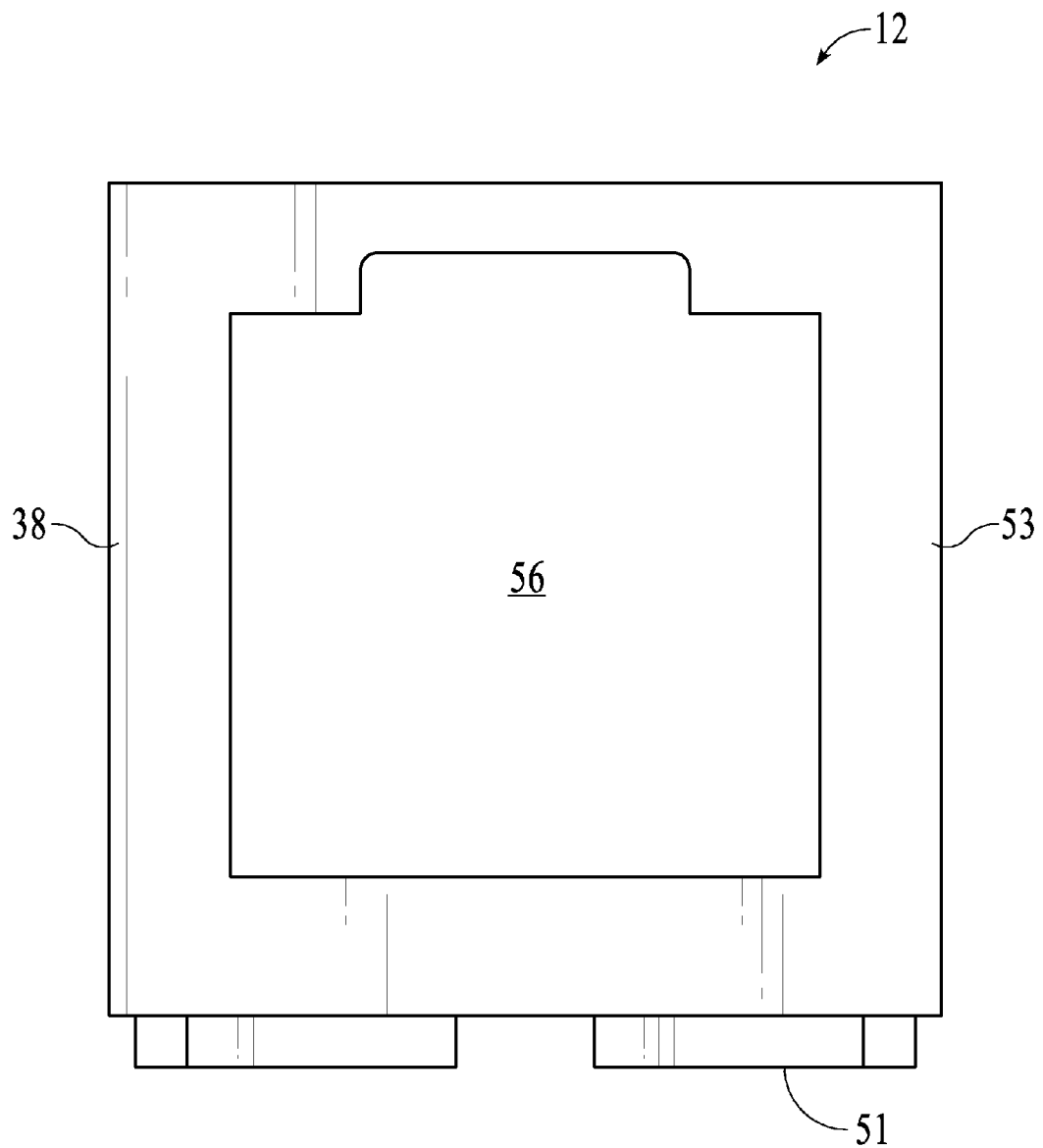
FIG. 6 shows a back side view of a plant container in accordance with an implementation.

FIG. 6 shows a back side view of modular plant container 12. Opening 56 allows light to reach a plant held within modular plant container 12.

Figure 7:
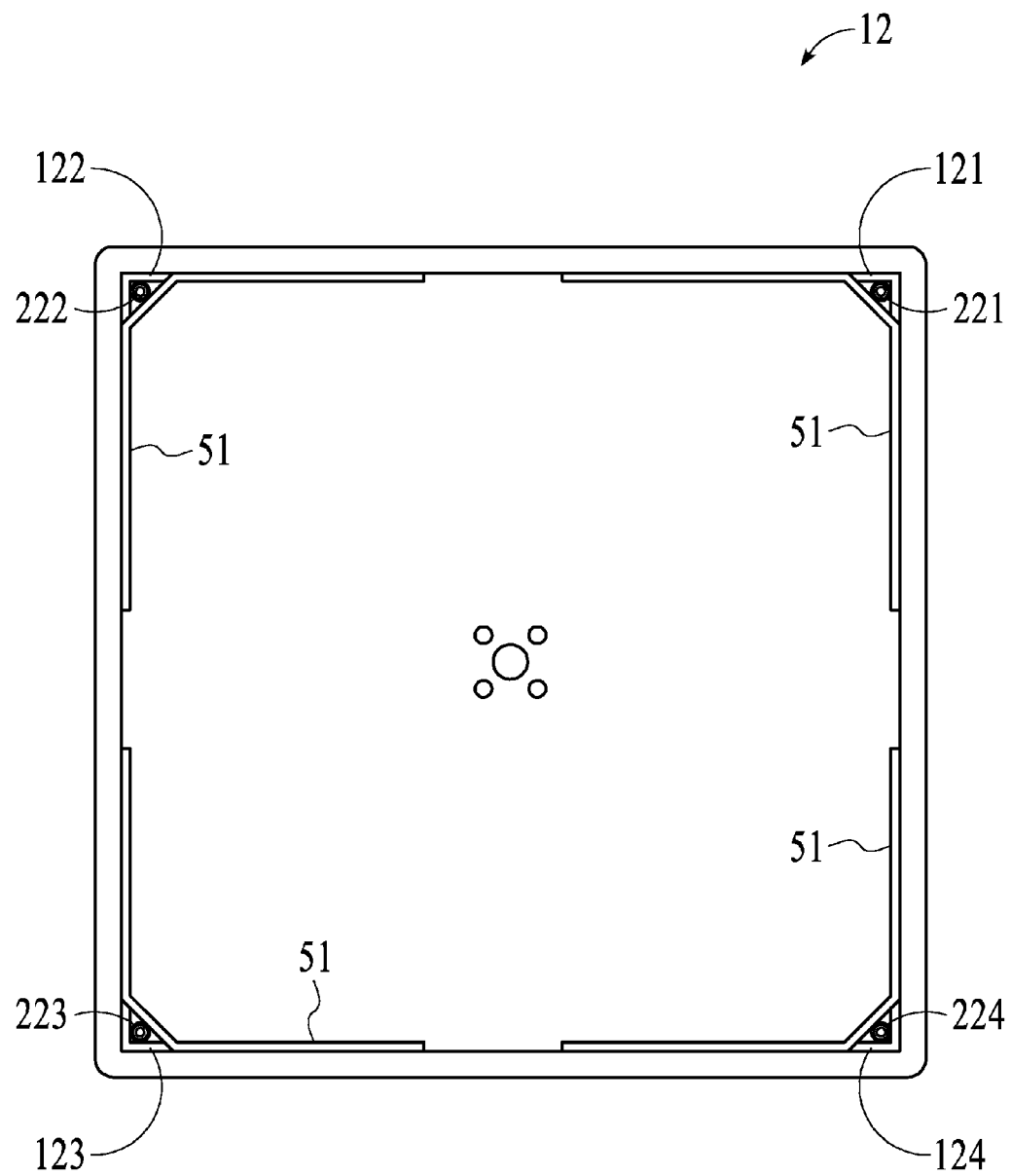
FIG. 7 shows a bottom view of a plant container in accordance with an implementation.

FIG. 7 shows a bottom view of modular plant container 12. A tube opening 221 within ridge section 121 allows water flowing through water path 35 to reach a modular plant container stacked blow modular plant container 12. A tube opening 222 within ridge section 122 allows water flowing through water path 53 to reach a modular plant container stacked blow modular plant container 12. A tube opening 223 within ridge section 123 allows water flowing through water path 38 to reach a modular plant container stacked blow modular plant container 12. A tube opening 224 within ridge section 124 allows water flowing through water path 36 to reach a modular plant container stacked blow modular plant container 12.

Figure 8:
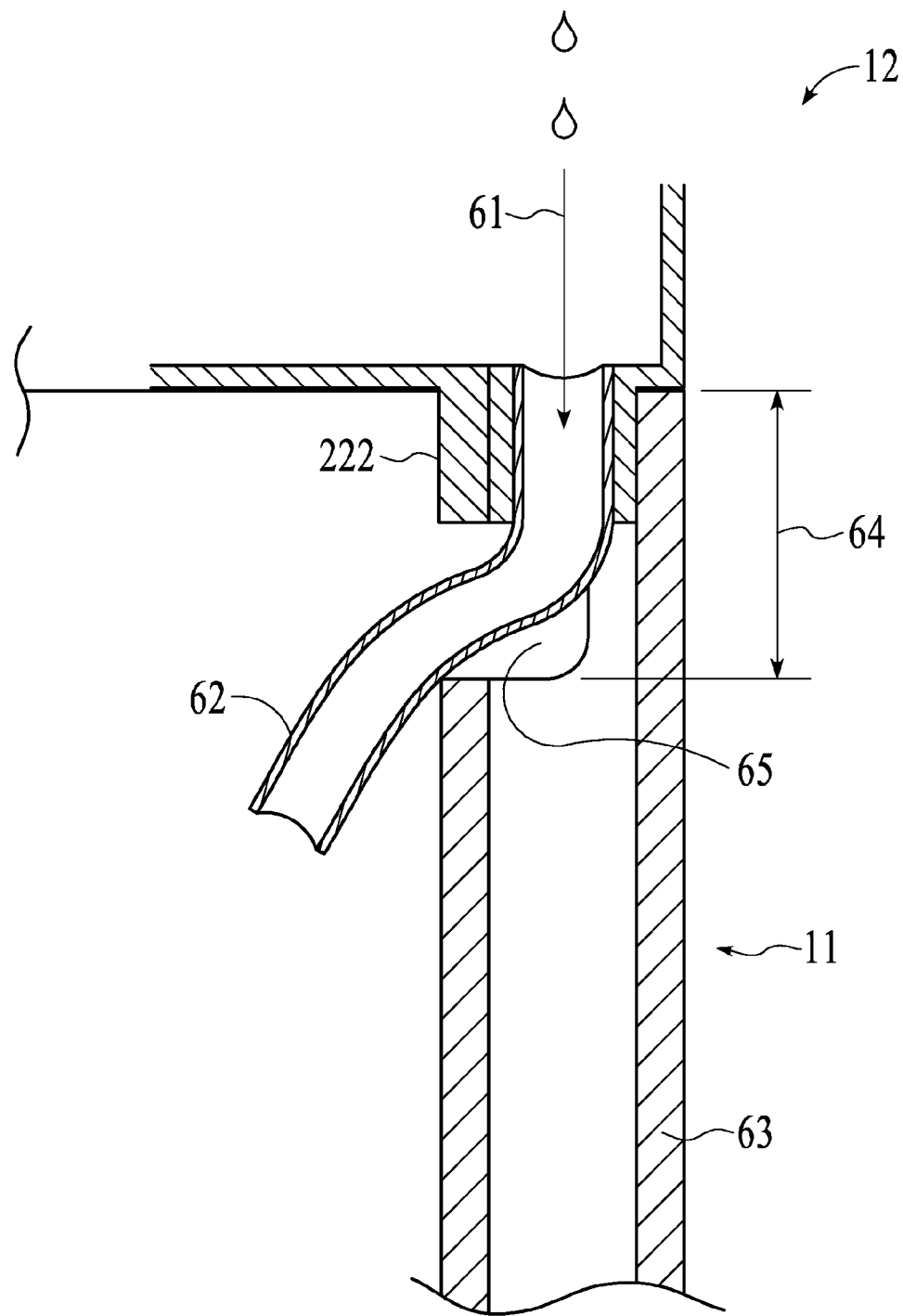
FIG. 8 and FIG. 9 illustrates water flow along a corner of a plant container in accordance with an implementation.

In FIG. 8, water flow through diverter 62 is illustrated by an arrow 61. Because of the presence of diverter 62 placed in an opening 65 of water path 63, water from opening 222 flows through diverter 62 rather than down water path 63. For example, a depth 64 of opening 65 is approximately one to two inches deep.

Figure 9:
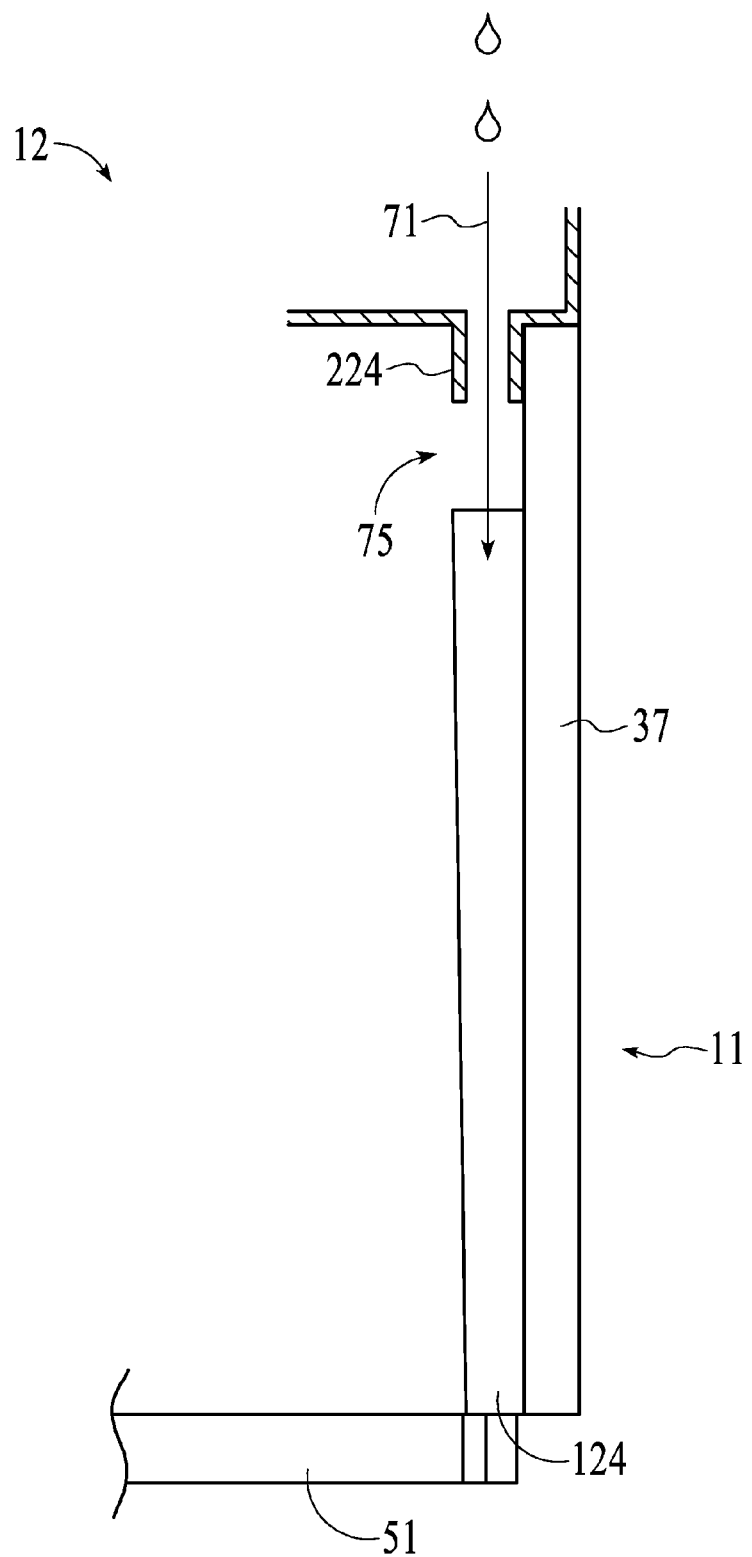

In FIG. 9, water flow down water path 37 is illustrated by an arrow 71. Because there is no diverter placed in an opening 75 of water path 37, water flows down water path 37.

Figure 10:
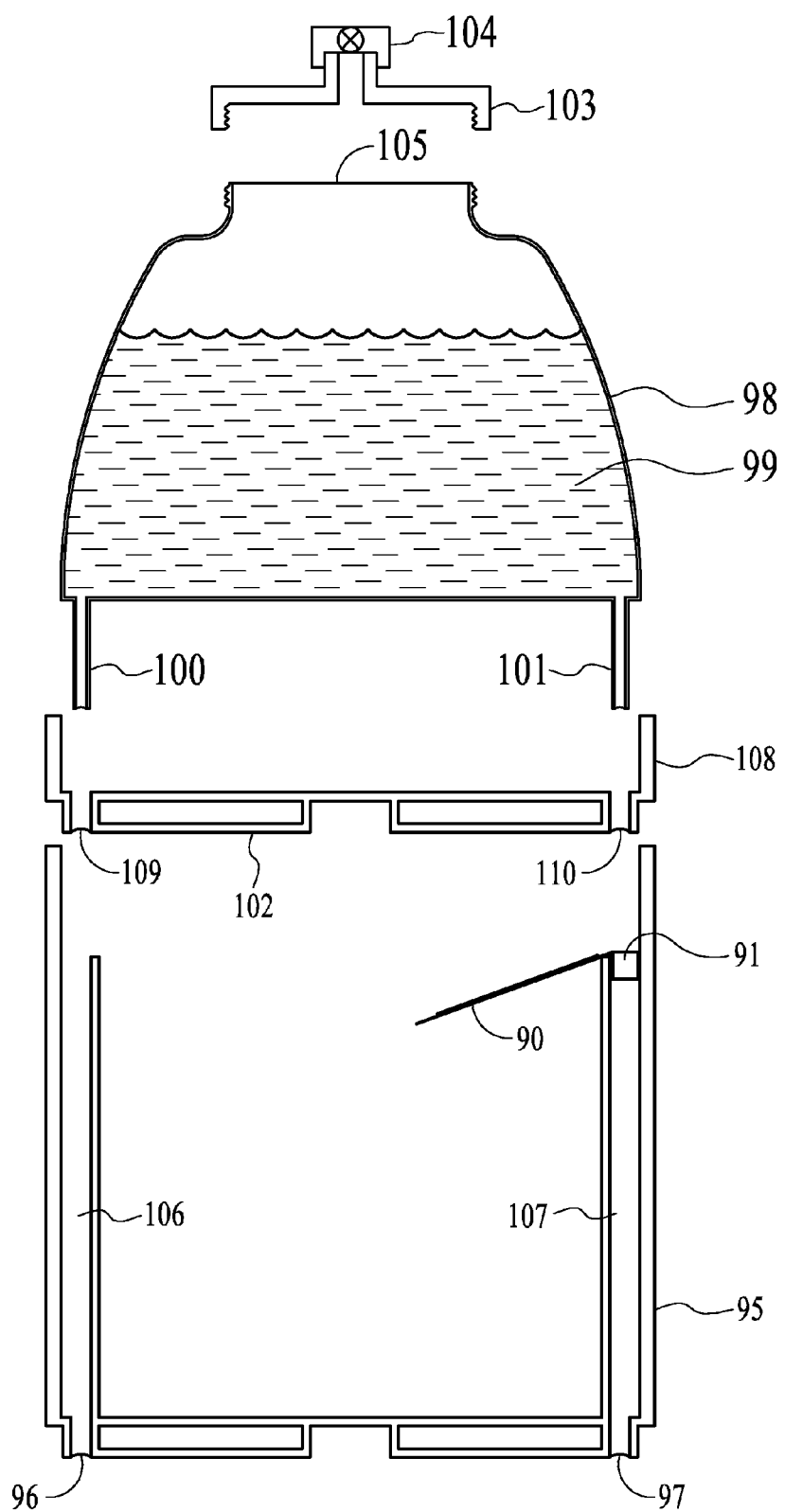
FIG. 10 shows a side of a modular plant container system in accordance with an implementation.

FIG. 10 shows another implementation of a modular plant container system. A modular plant container 95 has four water paths, one in each vertical corner. This is illustrated by a water path 106 and water path 107 shown in FIG. 10. A rounded bottom area 96 of water path 106 assists in directing water traveling through water path 106 into a modular plant container (not shown) on which modular plant container 95 is stacked. Likewise, a rounded bottom area 97 of water path 107 assists in directing water traveling through water path 107 into a modular plant container (not shown) on which modular plant container 95 is stacked.

A water container 98 is stacked on a square platform 102. Platform 102 includes sides 108 and a rounded bottom area at each corner, illustrated by a rounded bottom area 109 and a rounded bottom area 110 shown in FIG. 10. The rounded bottom areas are each shaped to receive a tube output of water container 98. The four tube outputs of water container 98 are represented in FIG. 10 by a tube output 100 and a tube output 101. A top opening 105 of water container 98 is covered and sealed by a lid 103. Lid 103 includes an adjustable opening 104. The amount of air allowed to pass through opening 104 is adjusted to control rate of flow of water 99 out of the four tube outputs of water container 98. This allows implementation of drip watering for plants in modular plant container 95 and any modular plant containers stacked below modular plant container 95.

Figure 11:
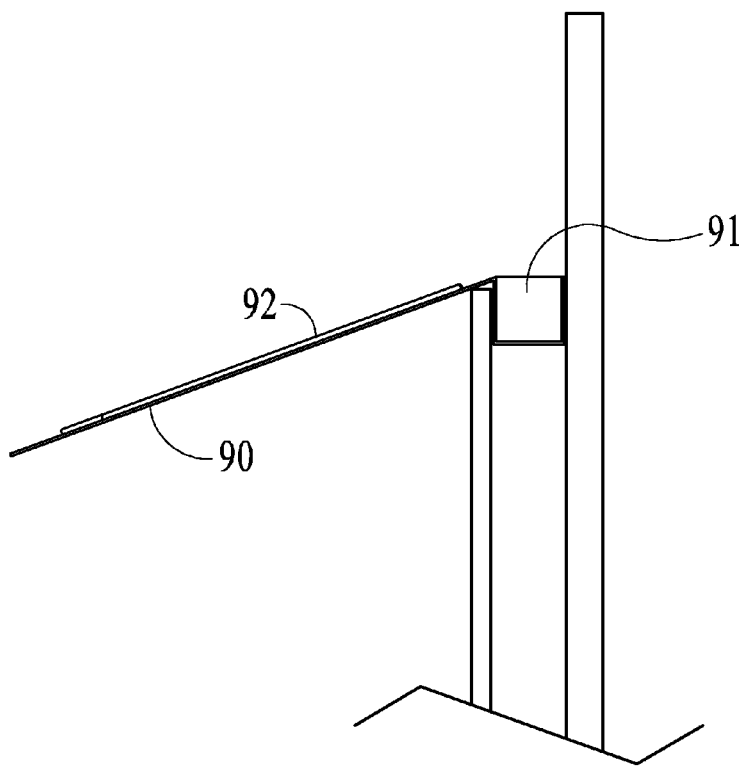
FIG. 11 and FIG. 12 illustrate use of a water drop insert in accordance with an implementation.
Figure 12:
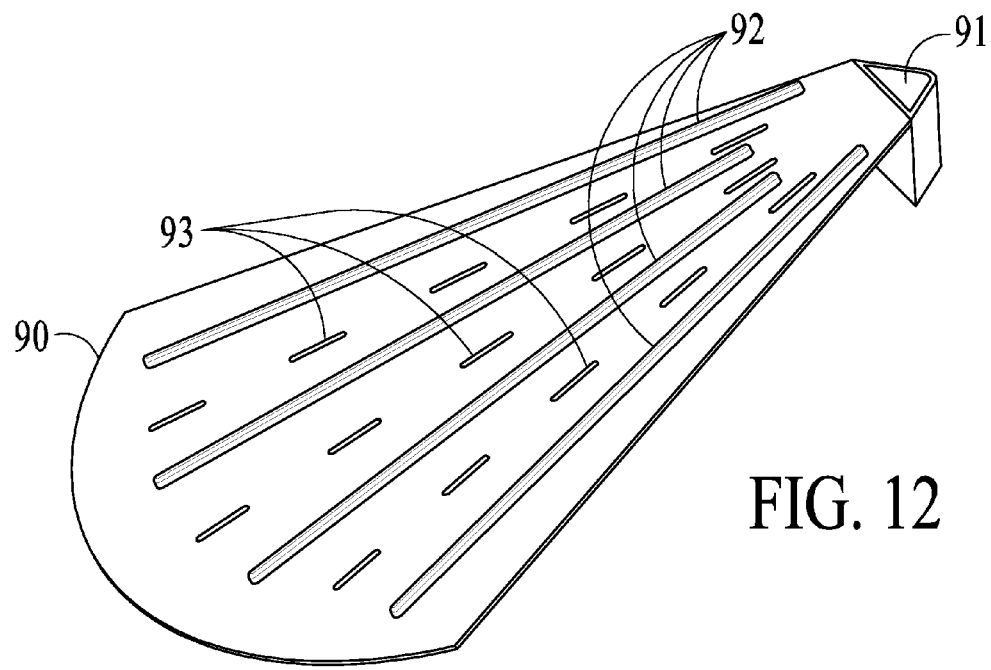

FIG. 11 and FIG. 12 show close up views of a water drop insert 90 that is placed at a top of water path 107. A recess area 91 intercepts water from entering water path 107. When recess area 91 is full of water, water is guided by ridges 92 into water drop holes 93. The water drips into plants housed within modular plant container 95.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A modular plant container comprising:
    a rectangular top with four corners, each corner of the rectangular top having an inflow opening for receiving fluid;
    a rectangular bottom with four corners, each corner of the rectangular bottom having an outflow opening for allowing the fluid to exit; and, a structure between the rectangular top and the rectangular bottom, the structure including openings that allow light to reach a plant within the modular plant container;
    wherein the structure forms a plurality of fluid paths, each fluid path extending from one of the inflow openings in the rectangular top an associated outflow opening in the rectangular bottom, each fluid path having a gap sized to allow a diverter, the diverter when present, diverting fluid to a target location within the modular plant container.

2. A modular plant container as in claim 1 wherein the openings in the structure include an opening in each side of the structure.

3. A modular plant container as in claim 1 wherein the rectangular top includes an opening that allows light to reach a plant within the modular plant container.

4. A modular plant container as in claim 1 wherein the diverter is a tube.

5. A modular plant container as in claim 1 wherein the rectangular bottom includes tracks shaped to allow precise fitting when stacking another plant container below the modular plant container.

6. A modular plant container as in claim 1 wherein the rectangular top includes tracks shaped to allow precise fitting when stacking another plant container above the modular plant container.

7. A modular plant container comprising:
    a top having a plurality of corners, each corner of the top having an inflow opening for receiving fluid;
    a bottom having a plurality of corners, each corner of the bottom having an outflow opening for allowing the fluid to exit; and,
    a structure between the top and the bottom, the structure including openings that allow light to reach a plant within the modular plant container;
    wherein the structure forms a plurality of fluid paths, each fluid path extending from one of the inflow openings in the top an associated outflow opening in the bottom, each fluid path having a gap sized to allow a diverter, the diverter when present, diverting fluid to a target location within the modular plant container.

8. A modular plant container as in claim 7 wherein the openings in the structure include an opening in each side of the structure.

9. A modular plant container as in claim 7 wherein the top includes an opening that allows light to reach a plant within the modular plant container.

10. A modular plant container as in claim 7 wherein the diverter is a tube.

11. A modular plant container as in claim 7 wherein the bottom includes tracks shaped to allow precise fitting when stacking another plant container below the modular plant container.

12. A modular plant container as in claim 7 wherein the top includes tracks shaped to allow precise fitting when stacking another plant container above the modular plant container.

13. A modular plant container comprising:
- a top having a plurality of inflow openings for receiving fluid;
- a bottom having a plurality of outflow openings for allowing the fluid to exit, wherein the bottom includes tracks shaped to allow precise fitting when stacking another plant container below the modular plant container; and,
- a structure between the top and the bottom, the structure including openings that allow light to reach a plant within the modular plant container;
- wherein the structure forms a plurality of fluid paths, each fluid path extending from one of the inflow openings in the top an associated outflow opening in the bottom, each fluid path having a gap sized to allow a diverter, the diverter when present, diverting fluid to a target location within the modular plant container.

14. A modular plant container as in claim 13 wherein the openings in the structure include an opening in each side of the structure.

15. A modular plant container as in claim 13 wherein the top includes an opening that allows light to reach a plant within the modular plant container.

16. A modular plant container as in claim 13 wherein the diverter is a tube.

17. A modular plant container as in claim 13 wherein the top includes tracks shaped to allow precise fitting when stacking another plant container above the modular plant container.

\* \* \* \* \*